United States Patent [19]

Stahly

[11] Patent Number: 4,804,141
[45] Date of Patent: Feb. 14, 1989

[54] THERMALLY RESPONSIVE VALVE

[75] Inventor: Daniel C. Stahly, Elmhurst, Ill.

[73] Assignee: Eaton Corporation, Cleveland, Ohio

[21] Appl. No.: 772,578

[22] Filed: Sep. 3, 1985

[51] Int. Cl.$^4$ ............................................. G05D 23/12
[52] U.S. Cl. ....................................... 236/100; 251/362
[58] Field of Search ........................... 236/86, 87, 100; 137/625.27; 251/DIG. 1, 362, 363

[56] References Cited

U.S. PATENT DOCUMENTS 2,368,206  1/1945  Du Charme ............... 251/362 X
4,085,775  4/1978  Steele, Jr. ..................... 137/625.5
4,375,873  3/1983  Enomoto et al. .................. 236/86

Primary Examiner—William E. Wayner
Attorney, Agent, or Firm—R. A. Johnston

[57] ABSTRACT

A three-port vacuum valve (10) having a thermally responsive actuator (38)n and a moveable valve member (62) with a single seal ring (66) thereon. A vacuum signal output port (24) is disposed between spaced primary (26) and secondary (22) vacuum source ports. A first (74) and a second (68) annular tapered valve seats are disposed in opposing relationship closely spaced adjacent said output port with said seal ring disposed therebetween. The valve seats are spaced such that upon said actuator experiencing a preselected temperature the seal ring is unseated from the second valve seat and is between the valve seats. Upon the actuator experiencing a given temperature differential from said preselected temperature, said seal ring seats against said first valve seat.

3 Claims, 2 Drawing Sheets

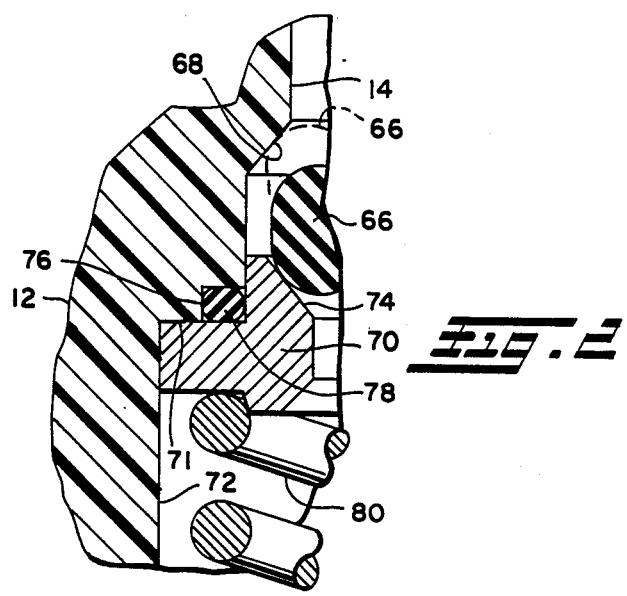
_Fig. 2_
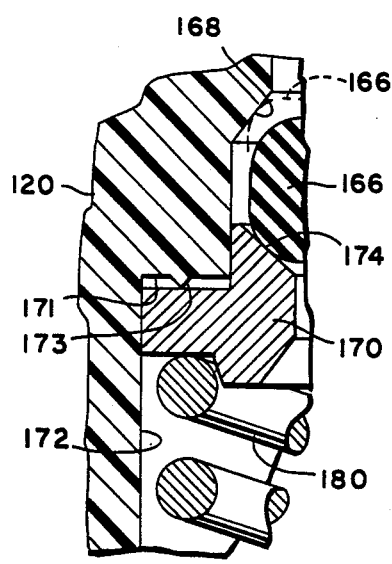

THERMALLY RESPONSIVE VALVE

BACKGROUND OF THE INVENTION

The present invention relates to thermally or temperature responsive valves of the type operative to valve a vacuum control signal port for connections between a plurality of vacuum source signals in response to experiencing preselected temperatures. Valves of this type are employed in automotive engine control applications where it is desired to provide a connection between a vacuum control signal port or line and a vacuum source having a known magnitude or characteristics when desired engine temperature is sensed for providing vacuum actuation of an engine accessory or control device.

In particular thermally responsive or temperature sensing valves are employed in automotive applications for switching or valving engine manifold vacuum to a vacuum control signal line for actuating a vacuum operated distributor timing advance mechanism upon engine coolant temperature reaching a preselected temperature. Typically, in such engine applications the manifold vacuum is closed from the control signal line and a ported venturi suction signal is employed for controlling the advance mechanism for cold engine operation prior to the engine coolant reaching a preselected temperature.

Temperature responsive vacuum valves for such automotive engine applications have heretofore employed a three-port valve arrangement having a valving member with a plurality of annular seals disposed thereon for axial movement between positions alternately seating and unseating the annular seals against spaced valve seats provided in the body of the valve. An example of such known devices is that described in U.S. Pat. No. 4,085,775, issued in the name of E. T. Steele, Jr.

In typical automotive engine applications, three-port thermally responsive vacuum valve have the temperature sensing unit threadably received in the engine block for exposure to coolant, with the housing portion having the vacuum connectors thereon disposed externally of the engine block for vacuum hose attachment thereto. In providing devices of this kind for installation on an engine block, it is required that the housing and vacuum line connectors extend outwardly from the engine block a minimal distance in order to provide adequate clearance for engine installation in the vehicle and for subsequent attachment of engine accessories without interfering with or mechanically damaging the valve. Thus it has been desired to provide a three-port thermally responsive vacuum valve for automotive engine applications which, upon installation in an engine block, extends outwardly therefrom a minimum distance and yet provides ease of access to the vacuum port connectors. Furthermore, it has been desired to provide such a three-port vacuum valve with a minimum housing length and having a simplified construction and ease of assembly which enables the valve to be manufactured at a minimum cost.

SUMMARY OF THE INVENTION

The present invention relates to temperature responsive three-port vacuum valves of the type employed for actuating control devices on an automotive engine in response to sensing engine coolant temperature. The present invention provides a solution to the above described problem of designing such a valve for minimal cost and simplicity of construction and yet having a minimum valve housing length extending from the engine block while providing for ease of vacuum hose connection thereto.

The present invention employs a one piece valve housing having therein a unitary valving member with a single annular seal ring provided thereon. The vacuum control signal output port has provided closely spaced on opposite sides thereof beveled valve seating surfaces with the valve sealing ring disposed therebetween. The valve member is spring biased to cause the annular seal ring to normally seat against one of the valve seating surfaces.

A thermally responsive actuator is provided attached to one end of the valve housing which actuator upon experiencing a predetermined temperature moves the valve member sufficiently to cause the annular seal to unseat and move to a position intermediate the valve seat for exposing the output signal port to the valving chamber and the vacuum level received from the remaining two ports. Upon the thermally responsive actuator sensing a preselected temperature differential above the initial actuation temperature, the valve member is moved to a position causing the seal ring to seat on the opposite valve seating surface for closing off one of the supply ports from the output port.

The present invention provides for a valve housing construction having a minimum spacing between the three vacuum port connectors the present invention provides a low cost compact temperature responsive valve assembly having simplified construction and minimal manufacturing cost.

BRIEF DESCRIPTION OF THE DRAWINGS

FIG. 2 is an enlarged view of a portion of the FIG. 1 embodiment;

FIG. 3 is a view similar to FIG. 2 of an alternate embodiment of the valve housing.

DETAILED DESCRIPTION

Figure 1:
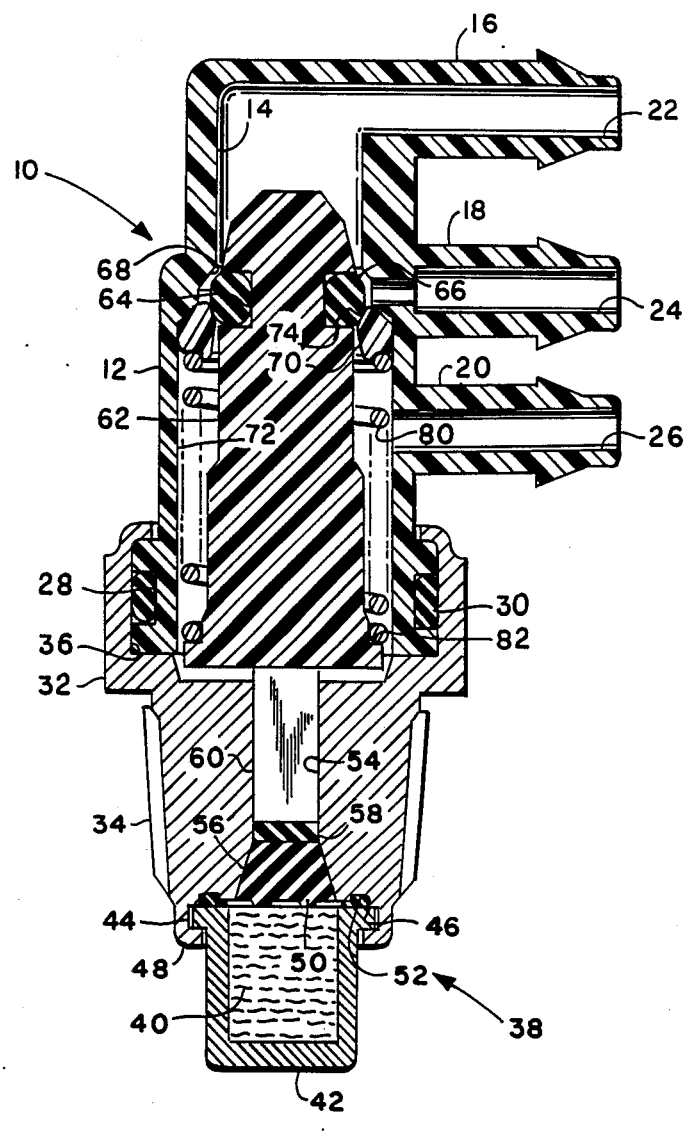
FIG. 1 is a cross section taken through the longitudinal center line of the valving member of the valve assembly of the present invention.

Referring now to FIG. 1, the valve assembly indicated generally at 10 has a unitary valving body 12 having a valving cavity 14 provided therein. The body 12 has a plurality, and preferably three, vacuum connectors 16, 18, 20 disposed therealong and extending from a common side of the housing in spaced generally parallel arrangement. The connectors 16, 18, 20 are adapted individually, as for example by annular barbed ribbed adjacent the ends thereof, for attachment to a vacuum hose. Each of the connectors 16, 18, 20 has a passage 22, 24, 26 respectively therethrough for porting to the valving chamber 14 for permitting fluid communication thereto through the connector.

In the presently preferred practice, the connectors 16, 18, 20 are spaced as closely together as is permissible, yet sufficient clearance is provided for installation of a vacuum hose thereover. The connectors are preferably arranged in a row; and, the center connector 18 is adapted for connection to a vacuum signal output hose or conduit. The upper connector 16 with respect to FIG. 1, is adapted for connection to a secondary vacuum source as for example ported carburetor venturi suction. The lower vacuum connector 20 is adapted for connection to the primary vacuum source such as for example the engine intake manifold vacuum.

The lower end of housing 12 has a flanged portion having a circumferential groove 28 formed therein groove having a seal ring 30 received therein. A lower mounting boss 32 having a threaded extremity 34 is provided and is adapted for threaded connection in a hole tapped in the engine block. The upper end of boss 32 has a recess 36 provided therein, with the lower end of body 12 received in the recess with sealing ring 30 compressed to seal about the inner periphery of the recess 36. The upper end of boss 32 is deformed over the flanged lower end of the body 12 to retain the boss 32 in permanent assembly with the body 12. In the presently preferred practice the invention, the boss 32 is formed of a suitable metal as for example brass.

The lower end of boss 32 has a thermal actuator, indicated generally 38, received thereon which actuator comprises a wax element 40 retained in a metal cup 42 the cup having an outwardly extending flanged rim 44 formed at the upper end thereof. Flanged rim 44 is received in an annular recess 46 formed in the lower end of boss 32. The lower end of the boss 48 forming the rim of recess 46 is deformed over the flange 44 to retain the cup 42 in permanent engagement with the boss 32.

The wax element 40 is retained and sealed within the cup 42 by a flexible diaphragm 50 having a rim bead portion received in a annular groove 52 provided in the recess 46 of the boss 32.

Boss 32 has a chamferd bore 54 provided therethrough having a resilient deformable plug 56 received in the chamferd end thereof which plug is preferably formed of a elastomeric material, as is diaphragm 50. A spacer disc 58 formed of resilient elastomeric material is received adjacent the upper transverse surface of the plug 56 and has received against the upper surface thereof a slidable actuating rod 60. In the preferred practice, the actuator rod is formed of suitable metal material.

A valve member 62 is received in cavity 14 for sliding movement therein and has a generally cylindrical configuration and extends from the lower end of the housing 12 vertically, with respect to FIG. 1, to the station intermediate the connectors 16, 18. Valve member 62 has an annular groove 64 formed thereabout adjacent the upper end thereof which is located along the valve member generally coincident with the passage 24.

A seal ring 66 is received in the groove 64 for longitudinal movement with the valve member 62.

A first valve seat 68 is provided in the inner periphery of the housing cavity 14, preferably formed integrally with the wall thereof and having an annular tapered configuration with the larger diameter thereof intersecting the port of passage 24 with the cavity 14.

Cavity 14 has an enlarged diameter section 72 in the region below connector 18 as shown in FIG. 1, which enlarged diameter section has received therein an annular valve seat ring 70.

Referring now to FIG. 2 a portion of the embodiment of FIG. 1 is shown enlarged to illustrate the details of the assembly of the valve seat ring 70.

The enlarged diameter 72 of the cavity 14 has a shoulder 71 formed therein for registration of the upper axial face of ring 70 thereagainst.

The body 12 has a circumferential groove 76 formed in the shoulder 71 at the inner periphery thereof which groove 76 has received therein a seal ring 78 for providing fluid pressure sealing between the valve seat ring 70 and the body 12.

Referring now the FIGS. 1 and 2 the valve seat ring 70 is urged into contact with shoulder 71 by the upper end of a compression spring 80. The lower end of spring 80 is registered against a flange 82 provided about the periphery of the lower end of the valve member 62.

Referring now particularly to FIG. 1 the valve assembly 10 is illustrated in the operating position at the instant the thermal actuator 38 has sensed an initial preselected temperature. In the position shown in FIG. 1, the thermal actuator has expanded to cause diaphragm 50, plug 56 and disc 58 to move the actuator rod 60 vertically upward into contact with the lower surface of valve member 62. In the illustrated position, the valve seal ring 66 is at the onset of lifting from the valve seat 74 (see also FIG. 2) for permitting fluid communication between passage 24 and the portion of the cavity surrounded by bore wall 72 and with vacuum source passage 26.

As thermal actuator 38 senses further increases in temperature, at a preselected differential above the first preselected temperature, the valve member 62 is moved upwardly until the seal ring 66 seats against valve seat 68 thereby sealing off cavity 14 and passage 22 from communication with the signal output passage 24. The upward position of the valve seal ring 66 is illustrated in dashed outline in FIG. 2.

In the presently preferred practice of the invention the initial preselected temperature at which the thermal actuator 38 causes the valve member 62 to move seal ring 66 away from contacting valve seat 74 is chosen as 95°–120° F. At a temperature differential in the range of 5°–10° thereabove, the seal ring is caused to seat against the upper valve surface 68. It will be understood however, that other temperature settings of the valving function may be employed, as desired, by suitable choice of the temperature characteristics of the wax element 40 and the length of the actuator rod 60.

Referring now to FIG. 3, an alternate embodiment of the valve assembly is shown wherein the body 120 has the larger diameter of valving cavity 172 provided with a shoulder 171 for registration of the valve seat ring 170 thereagainst. In the embodiment of FIG. 3, the shoulder 171 has formed integrally therewith an annular rib 173 which is deformed sufficiently by the annular valve seat ring 170, under the urging of compression spring 180, to effect a fluid pressure seal between the valve seat ring 170 and the housing 120.

The operation of the embodiment of FIG. 3 is otherwise identical to that of FIG. 2 with respect to the movement of the seal ring 166 between an initial position contacting valve seat surface 174 on ring 170 and the upper valve seat surface 168 provided on the body 120.

The present invention thus provides a unique three-port thermally actuated vacuum valve having a shortened, or compact, configuration with minimum spacing between the vacuum port connectors. The valve assembly of the present invention employs a single seal ring movable between opposing tapered annular valve seat surfaces disposed closely adjacent and on opposite sides of the vacuum output signal port. The presently disclosed device thus provides for valving between the first and second vacuum source ports with a minimum of valve movement required by the thermal actuator.

Although the invention has herein above been described and illustrated in the presently preferred practice, it will be understood by those having ordinary skill in the art that the invention is capable of modification and variation and is limited only by the following claims:

What is claimed:

1. A thermally responsive vacuum valve comprising:
   (a) housing means defining a valving chamber having a plurality of fluid ports therein, said housing means defining an annular first valve seat closely adjacent one of said fluid ports;
   (b) an annular insert member disposed in said housing means and having formed therein an annular second valve seat positioned in said chamber closely adjacent said one port and oppositely disposed thereabout with respect to said first valve seat;
   (c) a moveable valve member disposed in said chamber and having a sealing ring therein disposed for movement between said first and second valve seats;
   (d) said housing means defining an annular shoulder for registration of said insert member;
   (e) annular rib means formed integrally with one of said insert and said shoulder;
   (f) a spring having one reaction end thereof registering against said annular insert, said spring operative to effect sufficient material deformation as between said shoulder and said rib to effect a fluid pressure seal about said insert, said spring having the opposite reactive end thereof registering against said moveable valve member, whereby a common spring force is operative against said annular insert and said valve member;
   (g) thermally responsive means operative to effect movement of said valve member between said first and second valve seats.

2. The device defined in claim 1, wherein said annular rib is formed integrally on said shoulder, said rib being deformed for effecting said seal by said insert member under the urging of said bias means.

3. The device defined in claim 1, wherein said annular rib is formed integrally on said body shoulder and has a generally triangular configuration with the apex thereof deformed by said insert for effecting said seal.

* * * * *